United States Patent
Bangalore et al.

(10) Patent No.: US 10,025,687 B2
(45) Date of Patent: Jul. 17, 2018

(54) EVENT RATE CHANGE BASED HARDWARE PERFORMANCE DATA COLLECTION

(71) Applicant: International Business Machines Corporation, Armonk, NY (US)

(72) Inventors: Srinivas P. Bangalore, Bangalore (IN); Sooraj R. Nair, Vaddarpalya (IN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 15/163,860

(22) Filed: May 25, 2016

(65) Prior Publication Data
US 2017/0344455 A1    Nov. 30, 2017

(51) Int. Cl.
G06F 11/34    (2006.01)
G06F 11/30    (2006.01)

(52) U.S. Cl.
CPC ...... G06F 11/3495 (2013.01); G06F 11/3003 (2013.01)

(58) Field of Classification Search
CPC ............. G06F 11/3024; G06F 11/3452; G06F 11/3495
See application file for complete search history.

(56) References Cited

U.S. PATENT DOCUMENTS

| | | | |
|---|---|---|---|
| 7,263,431 B2 * | 8/2007 | Hashimoto | H03M 1/183 701/111 |
| 7,519,510 B2 * | 4/2009 | Koehler | G06F 11/3409 700/32 |
| 7,630,860 B1 * | 12/2009 | Donnelly | G06F 11/3419 702/182 |
| 8,136,124 B2 * | 3/2012 | Kosche | G06F 11/3447 714/47.1 |
| 8,572,581 B2 * | 10/2013 | Shafi | G06F 11/328 717/125 |
| 8,674,632 B2 * | 3/2014 | Kawano | H02P 6/08 318/400.02 |
| 9,543,963 B2 * | 1/2017 | Carlough | H03K 23/005 |
| 9,904,613 B2 * | 2/2018 | Nair | G06F 11/3452 |
| 2010/0239276 A1 * | 9/2010 | Nagatsuka | G03G 15/757 399/43 |
| 2011/0216031 A1 * | 9/2011 | Chen | G06F 3/044 345/174 |

(Continued)

FOREIGN PATENT DOCUMENTS

WO    2014152469 A1    9/2014

OTHER PUBLICATIONS

Tang et al., "Unsupervised Anomaly-based Malware Detection using Hardware Features", Columbia University, New York, USA, printed on Mar. 28, 2016, 21 pages.

Primary Examiner — Elmira Mehrmanesh
(74) Attorney, Agent, or Firm — Gilbert Harmon, Jr.

(57) ABSTRACT

An approach for writing performance data to memory based on a hardware event rate change involving receiving a hardware event count associated with a computer processor, comparing the hardware event count to a previous hardware event count, computing the hardware event rate change associated with a change between the hardware event count and the previous hardware event count and, responsive to the hardware event rate change not equaling a threshold rate, writing the hardware event count to memory.

17 Claims, 4 Drawing Sheets

(56) References Cited

U.S. PATENT DOCUMENTS

| | | | |
|---|---|---|---|
| 2012/0112770 A1* | 5/2012 | Philipp | G06F 3/0416 |
| | | | 324/658 |
| 2012/0123739 A1* | 5/2012 | Sethumadhavan | G06F 11/3466 |
| | | | 702/186 |
| 2013/0158918 A1* | 6/2013 | Spanier | G01R 22/10 |
| | | | 702/64 |
| 2014/0279740 A1 | 9/2014 | Wernevi et al. | |
| 2016/0328561 A1* | 11/2016 | Tamir | G06F 21/566 |

* cited by examiner

EVENT RATE CHANGE BASED HARDWARE PERFORMANCE DATA COLLECTION

BACKGROUND

The present invention relates generally to the field of hardware performance data, and more particularly to hardware performance data collection.

Many modern day computer processors comprise a performance monitoring unit (PMU) for gathering information about workload characteristics and computer hardware performance. PMUs are often implemented as counters which can be configured to count certain hardware events that correspond to performance metrics of the given processor. Some examples of hardware events can be, but are not limited to, instruction cycles, cache hits, cache misses and branch misses. Hardware event counters which track hardware performance data can periodically write the collected data into memory, consuming memory bandwidth in the process, where the data may be analyzed by monitoring software for gathering insights about hardware performance.

SUMMARY

According to one embodiment of the present invention, a method for writing performance data to memory based on a hardware event rate change is provided, the method comprising receiving a hardware event count associated with a computer processor; comparing the hardware event count to a previous hardware event count; computing the hardware event rate change associated with a change between the hardware event count and the previous hardware event count; and responsive to the hardware event rate change not equaling a threshold rate, writing the hardware event count to memory. A corresponding computer system and apparatus are also disclosed herein.

DETAILED DESCRIPTION

Embodiments of the present invention recognize that hardware counters on a computer processor which periodically send performance data to memory, e.g., cache memory, consume valuable memory bandwidth in the process. When the number of hardware events associated with the processor is acting as expected, e.g., staying at a relatively stable value or changing at a consistent linear rate, periodically writing the performance data, e.g., hardware event counts, to memory may lead to inefficient memory bandwidth consumption and power consumption, being that the data may be of little use or interest and the writes to memory are unnecessary.

Embodiments of the present invention therefore provide a solution wherein writing performance data associated with a computer processor to memory, i.e., a data collection, can be based on a hardware event rate change, thereby reducing excess bandwidth consumption associated with writing performance data when the number of hardware events is acting as expected. Depending on a comparison of the hardware event rate change, e.g., between data collection periods, to a predetermined threshold, embodiments can determine whether or not to write a hardware event count to memory, resulting in more efficient memory bandwidth consumption. In this manner, only performance data determined to be of use or interest will be sent to memory for further processing.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
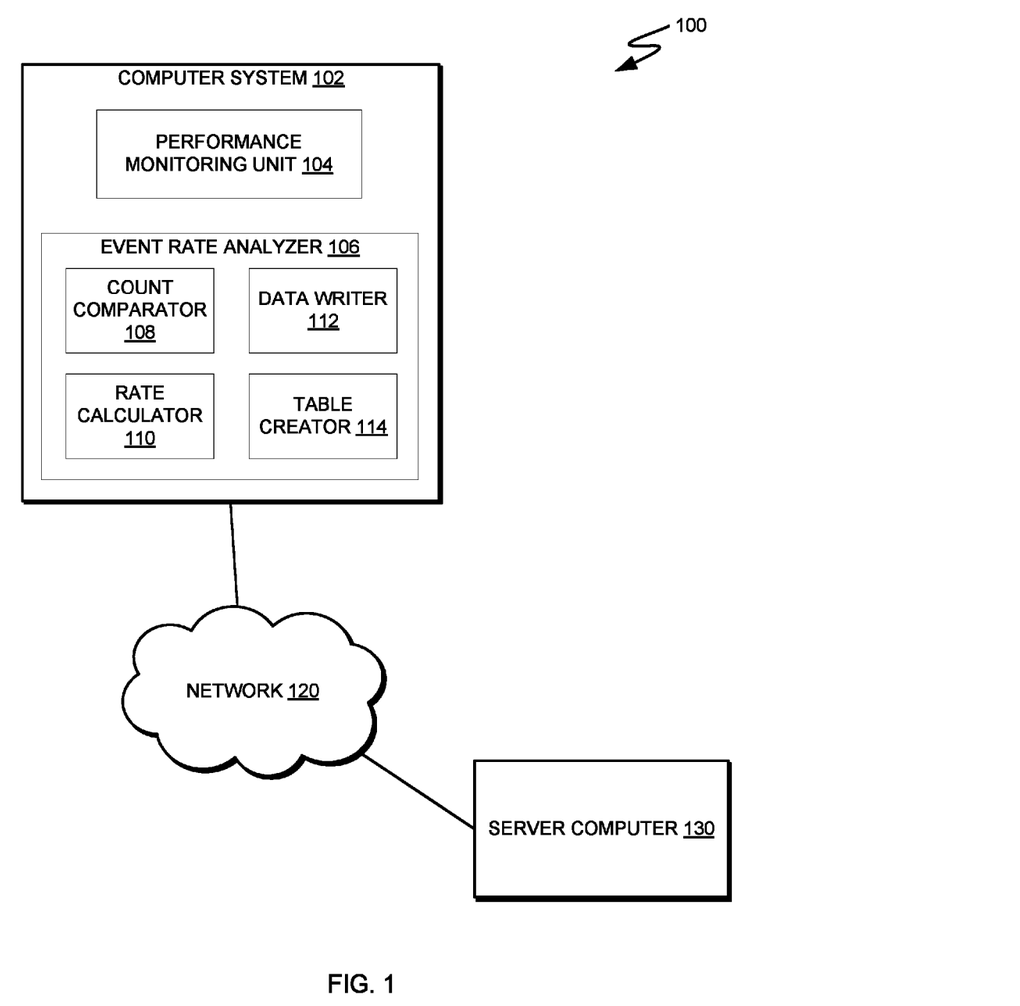
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 includes computer system 102 and server computer 130, interconnected over network 120.

Computer system 102 can be a laptop computer, tablet computer, netbook computer, personal computer (PC), a desktop computer, a personal digital assistant (PDA), a smart phone, or any programmable electronic device capable of communicating with server computer 130 via network 120. Computer system 102 comprises performance monitoring unit (PMU) 104 and event rate analyzer 106, wherein PMU 104 is associated with a computer processor of computer system 102. Computer system 102 may include internal and external hardware components, as depicted and described in further detail with respect to FIG. 4.

Event rate analyzer 106 can be a hardware facility capable of communicating with PMU 104 for determining whether or not to write performance data, associated with a computer processor, to memory based on a hardware event rate change between collection periods. It should be noted that event rate analyzer 106 can be shared for use amongst a plurality of performance monitoring units and/or hardware event counters. Event rate analyzer 106 comprises count comparator 108, rate calculator 110, data writer 112 and table creator 114. Count comparator 108 can receive a hardware event count from PMU 104 on a predetermined basis which can be compared to a previous hardware event count, e.g., from a previous data collection period.

Rate calculator 110 can calculate a hardware event rate change, based on the comparison of a received hardware event count to a previous hardware event count, and compare the rate change to a predetermined threshold. Depending on the comparison of the rate change to the predetermined threshold, data writer 112 either writes or does not write the performance data, e.g., the received hardware event count, to memory. Table creator 114 can create a nearest power of two reference table to be used by some embodiments for computing the hardware event rate change, as will be discussed in greater detail subsequently.

In various embodiments of the present invention, server computer 130 can be a laptop computer, tablet computer, netbook computer, personal computer (PC), a desktop computer, a personal digital assistant (PDA), a smart phone, or any programmable electronic device capable of communicating with computer system 102 via network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between computer system 102 and server computer 130.

Figure 2:
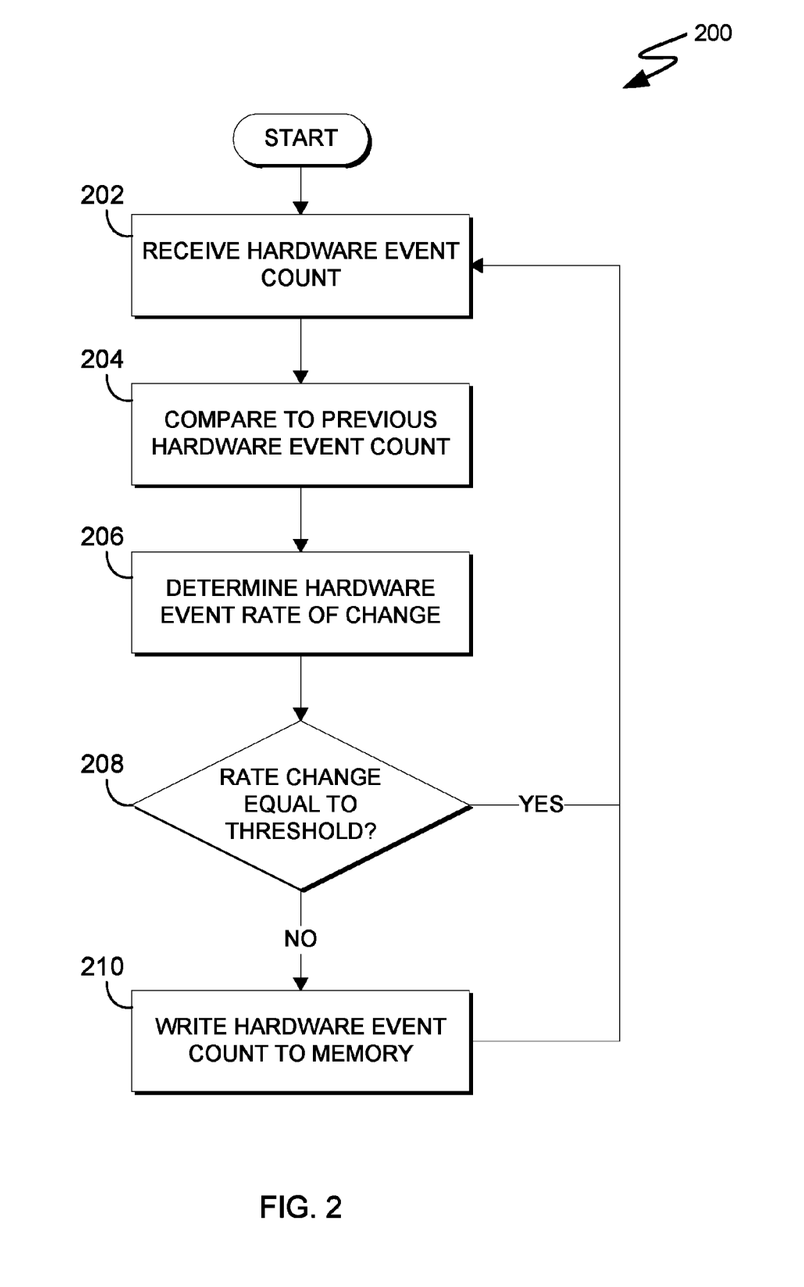
FIG. 2 is a flowchart depicting operational steps of a method for writing performance data to memory based on a hardware event rate change, in accordance with an embodiment of the present invention.

FIG. 2 is a flowchart depicting operational steps of a method for determining whether to write a hardware event count to memory based on a hardware event rate change, in accordance with an embodiment of the present invention. Count comparator 108 receives a hardware event count from PMU 104 (step 202), wherein PMU 104 is associated with a computer processor of computer system 102. Count comparator 108 compares the received hardware event count to a previous hardware event count, associated with a previous data collection period, for example (step 204). The previous hardware event count can have been sent to count comparator 108 from PMU 104 and stored by count comparator 108. It should be noted that the hardware event counts can be binary numbers, e.g., 16 bit binary numbers.

Rate calculator 110 computes a hardware event rate change between data collection periods, e.g., a collection period associated with the received hardware event count and a collection period associated with the previous hardware event count (step 206). Rate calculator 110 compares the computed hardware event rate change to a predetermined threshold rate (step 208). The predetermined threshold rate can be, for example, user configured, default or dynamically determined based on operational parameters of computer system 102.

According to some embodiments of the present invention, if the comparison of the rate change results in a determination that the rate is not equal to the predetermined threshold rate (step 208, NO branch), data writer 112 writes the received hardware event count to memory (step 210), whereas if the rate change is equal to the predetermined threshold rate (step 208, YES branch), data writer 112 does not write the received hardware event count to memory and/or can prevent another component, e.g., PMU 104, from writing the received hardware event count to memory. It should be noted that if the rate change is equal to the predetermined threshold rate, the hardware event count received (step 202) can be set as the previous hardware event count. Further, in some embodiments, a hardware event rate change which is not equal to the predetermined threshold rate can be set as a new threshold rate to compare future rates of hardware event changes against, as will be described in greater detail subsequently.

Figure 3:
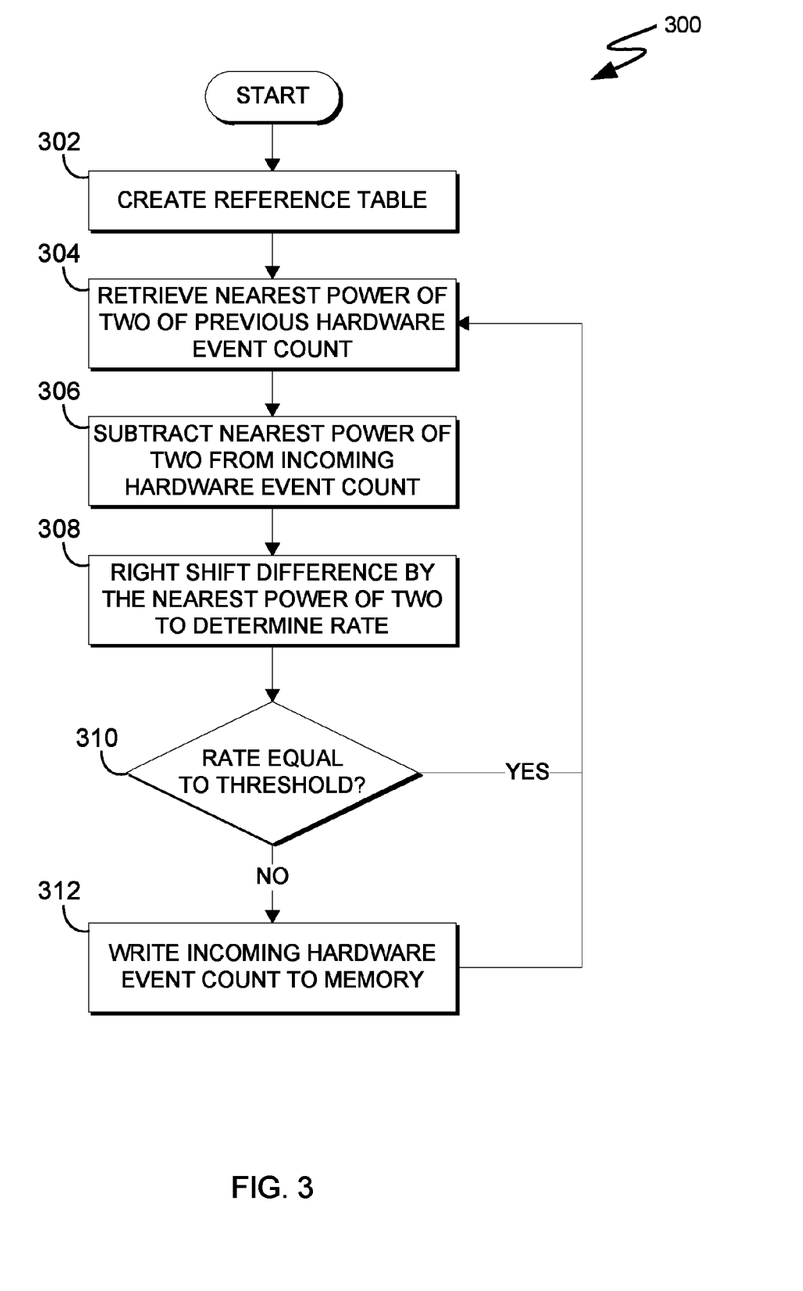
FIG. 3 is a flowchart depicting operational steps of an event rate analyzer operating on a computer system within the data processing environment of FIG. 1, in accordance with an embodiment of the present invention.

FIG. 3 is a flowchart 300 depicting operational steps of event rate analyzer 106, in accordance with one embodiment of the present invention. Table creator 114 creates a reference table comprising a plurality of nearest powers of two (NPT) (step 302) corresponding to bit positions in a binary number, e.g., a 16 bit binary number. The reference table can be used by count comparator 108 to find a NPT for a hardware event count, based on the most significant bit (MSB), i.e., the highest set bit in a binary number, of the hardware event count. For example, if the MSB of a hardware event count is the second bit, event rate analyzer 106 will find a NPT of 2 for the hardware event count, or if the MSB is the third bit, a NPT of 4 will be found, etc. The NPT for a given binary number, e.g., a hardware event count, represents the lowest possible value that the given binary number can have based on the MSB of the number.

Rate calculator 110 can use a predetermined number of variables for computational purposes, e.g., rate, thresh, old_count, new_count and num_count, wherein the variables rate, thresh, old_count and num_count can be initialized to 0. It should be noted that the variables can be binary numbers. According to one embodiment, responsive to receiving an incoming hardware event count, rate calculator 110 sets the variable new_count to the value of the incoming hardware event count and count comparator 108 finds, i.e., retrieves, the NPT of old_count using the reference table (step 304), wherein old_count represents a hardware event count from a previous collection period. The variable num_count can correspond a consecutive number of times that a same value is received as the incoming hardware event count.

Rate calculator 110 subtracts the NPT, corresponding to old_count, from new_count (step 306). It is noteworthy that in the event that old_count is 0, the corresponding NPT can be 1. Rate calculator 110 right shifts the calculated difference of step 306 by the NPT corresponding to old_count (step 308), resulting in an approximate hardware event rate change between the previous hardware event collection, e.g., old_count, and a most recent hardware event count, e.g., new_count. The variable, rate, can be set to this result of step 308.

Rate calculator 110 compares rate to the variable, thresh, i.e., a threshold value for determining whether or not to write an incoming hardware event count to memory (step 310). If rate is equal to thresh (step 310, YES branch), new_count is not written to memory by data writer 112 and num_count, having an initial value of 0, is incremented by 1. Event rate analyzer 106 will subsequently return to step 304 to retrieve a NPT of old_count, responsive to receiving a new incoming hardware event count.

If rate is not equal to thresh (step 310, NO branch), data writer 112 writes new_count to memory and rate calculator 110 sets thresh to the value of rate, sets old_count to the value of new_count and computes the following product, which is also written to memory (step 312):

$$[\text{old\_count} * (\text{num\_count} + 1)]$$

Additionally, rate calculator 110 resets num_count to 0 after num_count has been used to compute the product (step 312). In this embodiment, the calculated, approximate hardware event rate change becomes a new threshold for determining whether or not to send, i.e., write, the incoming hardware event count to memory (step 312). Further, at every instance that step 312 is performed, each computed product is written cumulatively to memory, i.e., each computed product is successively added to an accumulating total written to memory by data writer 112.

Figure 4:
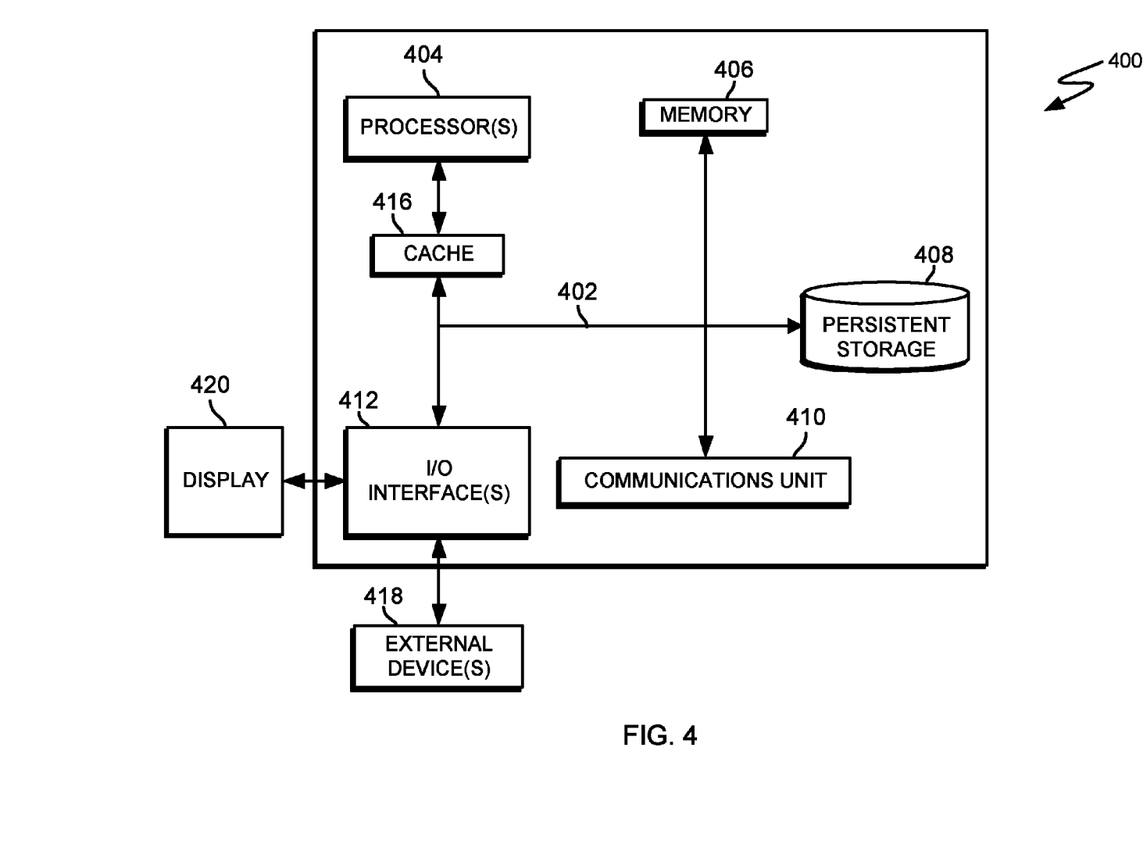
FIG. 4 is a block diagram of components of the computer system executing the event rate analyzer, in accordance with an embodiment of the present invention.

FIG. 4 depicts a block diagram 400 of components of computer system 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 102 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Event rate analyzer 106 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Event rate analyzer 106 can be downloaded to persistent storage 408 through communications unit 410.

I/O interface(s) 412 allows for input and output of data with other devices that can be connected to computer system 102. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., event rate analyzer 106, can be stored on such portable computer readable storage media and can be loaded onto persistent storage 408 via I/O interface(s) 412. I/O interface(s) 412 also connect to a display 420. Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and apparatuses according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for writing performance data to memory based on a hardware event rate change, the method comprising:
    receiving a hardware event count associated with a computer processor;
    creating a reference table comprising a plurality of nearest powers of two, wherein each nearest power of two corresponds to an associated most significant bit of a binary number;
    retrieving a nearest power of two associated with the previous hardware event count;
    comparing the hardware event count to a previous hardware event count;
    computing the hardware event rate change associated with a change between the hardware event count and the previous hardware event count; and
    responsive to the hardware event rate change not equaling a threshold rate, writing the hardware event count to memory.

2. The method of claim 1, wherein computing the hardware event rate change comprises computing a difference associated with subtracting the nearest power of two, associated with the previous hardware event count, from the hardware event count and right shifting the difference by the nearest power of two.

3. The method of claim 1, wherein computations associated with computing the hardware event rate change use a plurality of variables comprising rate, thresh, old_count, new_count and num_count.

4. The method of claim 3, wherein rate is associated with the hardware event rate change, thresh is associated with the threshold rate, old_count is associated with the previous hardware event count, new_count is associated with the hardware event count and num_count is associated with a number of times that a same value is received as the hardware event count.

5. The method of claim 4, wherein responsive to a determination that rate is not equal to thresh, new_count is written to memory.

6. The method of claim 1, wherein responsive to the hardware event rate change not equaling the threshold rate, the threshold rate is set as the hardware event rate change.

7. A computer system for writing performance data to memory based on a hardware event rate change, the computer system comprising:
    one or more computer processors;
    one or more computer readable storage media;
    an event rate analyzer comprising a count comparator, a data writer, a rate calculator and a table creator;
    program instructions stored on the one or more computer readable storage media for execution by at least one of the one or more processors, the program instructions comprising:
        program instructions to receive a hardware event count associated with a computer processor;
        program instructions to create a reference table comprising a plurality of nearest powers of two, wherein each nearest power of two corresponds to an associated most significant bit of a binary number;

program instruction to retrieve a nearest power of two associated with the previous hardware event count;
program instructions to compare the hardware event count to a previous hardware event count;
program instructions to compute the hardware event rate change associated with a change between the hardware event count and the previous hardware event count; and
program instructions to, responsive to the hardware event rate change not equaling a threshold rate, write the hardware event count to memory.

8. The computer system of claim 7, wherein the program instructions to compute the hardware event rate change comprise computing a difference associated with subtracting the nearest power of two, associated with the previous hardware event count, from the hardware event count and right shifting the difference by the nearest power of two.

9. The computer system of claim 7, wherein computations associated with the program instructions to compute the hardware event rate change use a plurality of variables comprising rate, thresh, old_count, new_count and num_count.

10. The computer system of claim 9, wherein rate is associated with the hardware event rate change, thresh is associated with the threshold rate, old_count is associated with the previous hardware event count, new_count is associated with the hardware event count and num_count is associated with a number of times that a same value is received as the hardware event count.

11. The computer system of claim 10, wherein responsive to a determination that rate is not equal to thresh, new_count is written to memory.

12. The computer system of claim 7, wherein responsive to the hardware event rate change not equaling the threshold rate, the threshold rate is set as the hardware event rate change.

13. An apparatus for writing performance data to memory based on a hardware event rate change, the apparatus comprising:

a count comparator for receiving a hardware event count associated with a computer processor and comparing the hardware event count to a previous hardware event count;
a table creator for creating a reference table comprising a plurality of nearest powers of two, wherein each nearest power of two corresponds to an associated most significant bit of a binary number and the count comparator retrieves a nearest power of two associated with the previous hardware event count;
a rate calculator for computing the hardware event rate change associated with a change between the hardware event count and the previous hardware event count; and
a data writer for writing the hardware event count to memory when the hardware event rate change does not equal a threshold rate.

14. The apparatus of claim 13, wherein the rate calculator computes a difference associated with subtracting the nearest power of two, associated with the previous hardware event count, from the hardware event count and right shifts the difference by the nearest power of two.

15. The apparatus of claim 13, wherein the rate calculator uses a plurality of variables comprising rate, thresh, old_count, new_count and num_count for computing the hardware event rate change.

16. The apparatus of claim 15, wherein rate is associated with the hardware event rate change, thresh is associated with the threshold rate, old_count is associated with the previous hardware event count, new_count is associated with the hardware event count and num_count is associated with a number of times that a same value is received as the hardware event count.

17. The apparatus of claim 13, wherein the rate calculator sets the threshold rate as the hardware event rate change when the hardware event rate change does not equal the threshold rate.

* * * * *